United States Patent Office 2,953,773
Patented Sept. 20, 1960

2,953,773

AUTOMATIC POSITION CONTROL APPARATUS

Frank Di Nicolantonio, Jr., Lockport, N.Y., assignor to Westinghouse Electric Corporation, East Pittsburgh, Pa., a corporation of Pennsylvania Filed Dec. 17, 1957, Ser. No. 703,419

6 Claims. (Cl. 340—149)

The present invention relates, in general, to automatic position control apparatus, and more particularly to digital control apparatus for controlling the position of a movable member, such as a machine member or the like, as may be desired in the operation of some machine device. For example, the present control apparatus may be operative for controlling a movable first member in a predetermined desired position and be employed for automatically correcting the position of said first member relative to a fixed position second member and/or corresponding to a predetermined desired separation between said first and second members.

It is an object of the present invention to provide improved control apparatus for controlling the operation and/or position of a machine device or movable member, with said apparatus being operative in an improved manner to provide a control signal in digital form corresponding to a predetermined relationship between the actual position of said machine device or member relative to a predetermined desired position for said machine device or member.

It is another object of the present invention to provide improved control apparatus for automatically controlling the operation of a movable member by providing a first control signal corresponding to a predetermined difference relationship between a second control signal corresponding to a predetermined desired position for said member and a third control signal corresponding to the actual position of said member, with said first control signal determining both the direction of difference correcting movement for said member as well as the amount of movement for said member and the speed of said movement.

It is a further object to provide improved digital control apparatus for controlling the position of a movable member such as a machine component for providing a position correcting resultant digital control signal by comparing a first digital control signal corresponding to a predetermined desired position for said member with a second digital control signal corresponding to the actual position for said member, with an additional signal being provided to determine the direction of any position correcting movement due to said resultant control signal.

It is an additional object to provide improved control apparatus for controlling the position of a movable member in an improved manner such that the member is more accurately positioned and any position error is more rapidly corrected and removed.

These and other objects and advantages of the present invention will become apparent in view of the following description taken in conjunction with the drawings, wherein.

Figure 1:
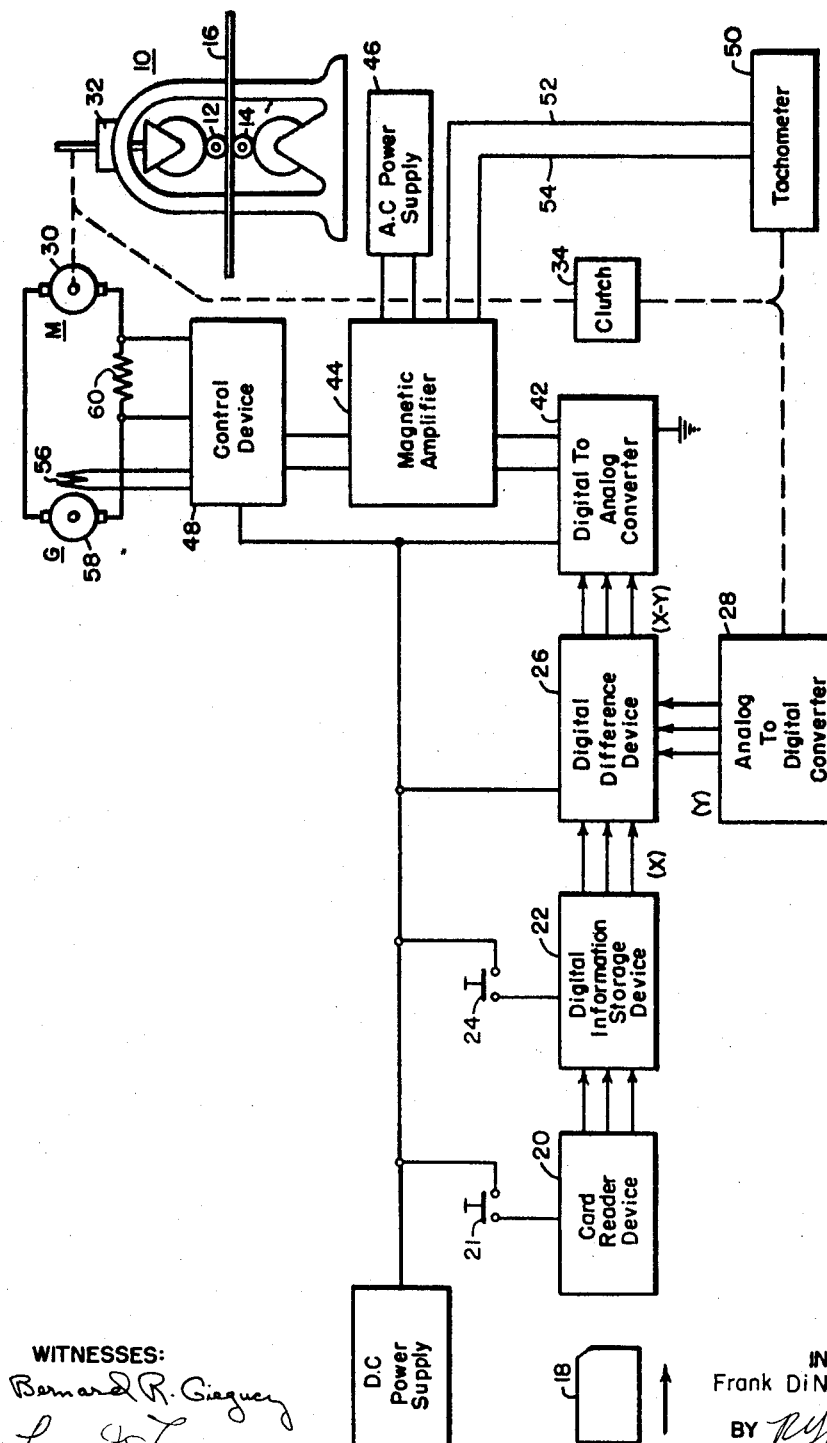
Figure 1 is a diagrammatic view of one form of control apparatus in accordance with the present invention.

In Fig. 1 there is shown an automatic position control system in accordance with the present invention for controlling the screwdown of a rolling mill 10 wherein the spacing between an upper roller member 12 relative to a lower roller member 14 is controlled for determining the thickness of a metal strip 16 which is passing between the roller members 12 and 14.

A punched card or similar input information containing control member 18 may be provided for illustration only with input information corresponding to the predetermined desired spacing between the roller members 12 and 14 which, as shown in Fig. 1, is determined by controlling the position of the upper roller member 12 relative to the fixed position of the lower roller member 14. The control card 18 contains the input control information in the form of punched holes corresponding to the respective binary digits of a digital input control signal X. In this regard, the control card 18 could be in the form of a magnetic tape or other type of information containing control member. A card reader device 20 receives the control card 18 and is operative to convert the information from the control card 18, in a form of punched holes or the absence of punched holes for each particular digit of the binary control signal fed into the card reader device, into an electrical control signal broken down in digital and binary form, with the number of digits determining, in part, the resulting accuracy of the position control of the movable roller member 12. One suitable form for the card reader device 20 would comprise a brush member for each digit of the particular binary control signal, which brush member in the presence of a punched hole for any particular digit may provide a unit value control signal and in the absence of a punched hole for that particular digit may not provide a control signal or would provide a control signal of zero value. The digital information storage device 22 is operative to store the input control signal X in digital form and may comprise a plurality of Flip-Flop circuits, with one of said Flip-Flop circuits being provided for each digit of the particular binary control signal received, and which may correspond to a single pass of the strip 16 between the roller members 12 and 14, and if desired, the digital information storage device 22 may be provided with a second binary control signal for the next succeeding pass of the same strip of material 16 or another strip of material between the roller members 12 and 14. In this regard, the digital information storage device 22 may comprise a Flip-Flop device for each digit of any particular binary control signal and, in addition, may include an additional group of Flip-Flop devices for each succeeding binary control signal.

The digital information storage device 22 is operative to supply through its output to the digital difference device 26, the respective binary electrical signals for each digit of any one particular input binary control signal.

A second input to the digital difference device 26 is received from an analog-to-digital converter device 28 in the form of a binary control signal in digital form corresponding to the actual position of the upper roller member 12 as determined by the screwdown motor 30 operating with a screwdown control device 32 and through a suitable clutch device 34, such that the analog-to-digital converter 28 receives as an analog input through the clutch device 34, the position of the upper roller member 12 and converts it into a digital form of binary control signal Y which is supplied through the connection to the second input of the digital difference device 26. The latter digital difference device 26 is operative to determine the difference between the reference or predetermined desired position binary control signal X and the actual position binary control signal Y received from the analog-to-digital converter device 28, and provides an output binary control signal $(X-Y)$ in digital form to the digital-to-analog converter device 42 which is operative to energize a control winding of a magnetic amplifier device 44 as a function of the difference binary control signal $(X-Y)$ received from the digital difference device 26.

The load windings of the magnetic amplifier device 44 are energized by a suitable alternating current power supply 46 and may be operative with a pair of field windings of a generator energization control device 48. A tachometer 50 is operative through the clutch device 34 to provide through its output conductors 52 and 54 a control signal as a function of the rate of change in position of the upper roller member 12 as determined by the operative speed of the motor 30 which control signal may be supplied to a second control winding of the magnetic amplifier device 44. The control device 48 thereby controls the energization of field windings 56 of the supply generator 58 connected to supply power to the screwdown motor 30. The polarity of the current in winding 56 of the supply generator 58 will determine the direction of rotation of the motor 30. It should be understood that the load windings of the magnetic amplifier device 44 may instead be directly operative in the well-known push-pull arrangement to control the energization of the field windings 56 if desired. A series impedance member 60 is operative to provide a current limit feedback signal to a second field winding or like control member of the rototrol control device 48, or a control winding of the magnetic amplifier 44, if desired.

It should be here noted that the digital-to-analog converter device 42 is described in greater detail in a copending patent application entitled "Signal Converter Apparatus," by W. M. Brittain, filed April 16, 1957, Serial No. 653,123, and assigned to the same assignee as the present application.

It should be further here noted that the automatic position control system as shown in Fig. 1 is described in greater detail in a copending patent application entitled "Automatic Digital Control Apparatus" by W. M. Brittain, filed April 16, 1957, Serial No. 653,122, and assigned to the same assignee as the present application.

Figures 2, 6:
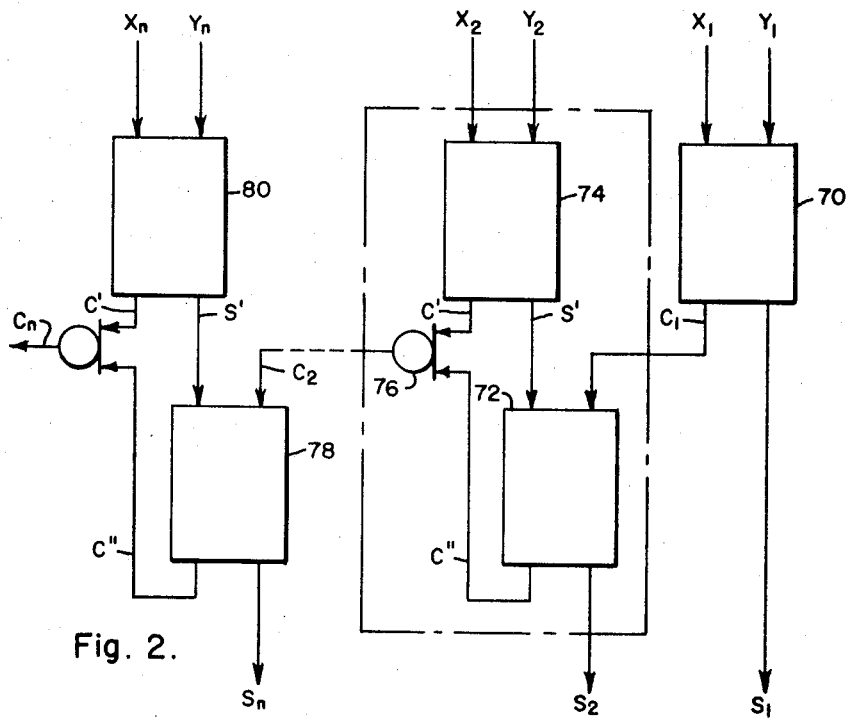
Fig. 2 is a schematic showing of a prior art binary computer device.
Fig. 6 is an illustrative view of a movable machine member to be positioned relative to a fixed machine member in accordance with the teachings of the present invention.

In Fig. 2 there is shown a diagrammatic view of apparatus for the addition of two binary numbers respectively having a plurality of digits $X_1, X_2 \ldots X_n$ and $Y_1, Y_2 \ldots Y_n$ to produce a sum S having a plurality of digits $S_1, S_2 \ldots S_n$. The first digit $S_1$ of the sum is obtained by adding $X_1$ first digit and the $Y_1$ first digit in a half adder circuit 70. The carry digit $C_1$ so provided by the first half adder circuit 70 is supplied to a second half adder circuit 72. The $X_2$ digit and the $Y_2$ digit are added in a third half adder circuit 74, with the sum of these digits S' being supplied to said second half adder circuit 72 for addition with the carry digit $C_1$ from the first half adder circuit 70 to provide the second digit $S_2$ of the sum and a carry C'' to an OR circuit 76. The carry digit C' from said third half adder circuit 74 is also supplied to the OR circuit 76. It should be noted from the rules of binary addition that it is impossible to have carry signals simultaneously from both the half adders 72 and 74 in any given order. Thusly, the carry digit $C_2$ which is sent to the next highest digit order or the third order is therefore comprised of one of C' or C''. The final or $n^{th}$ digit summation effected by the half adders 78 and 80 is similar to the operation described for the second digit operation relative to the $X_2$ and $Y_2$ digits, and is operative to provide the $n^{th}$ digit $S_n$ of the sum.

The operation of the apparatus as shown in Fig. 2 is believed to be well known to persons skilled in this particular art.

Figure 3:
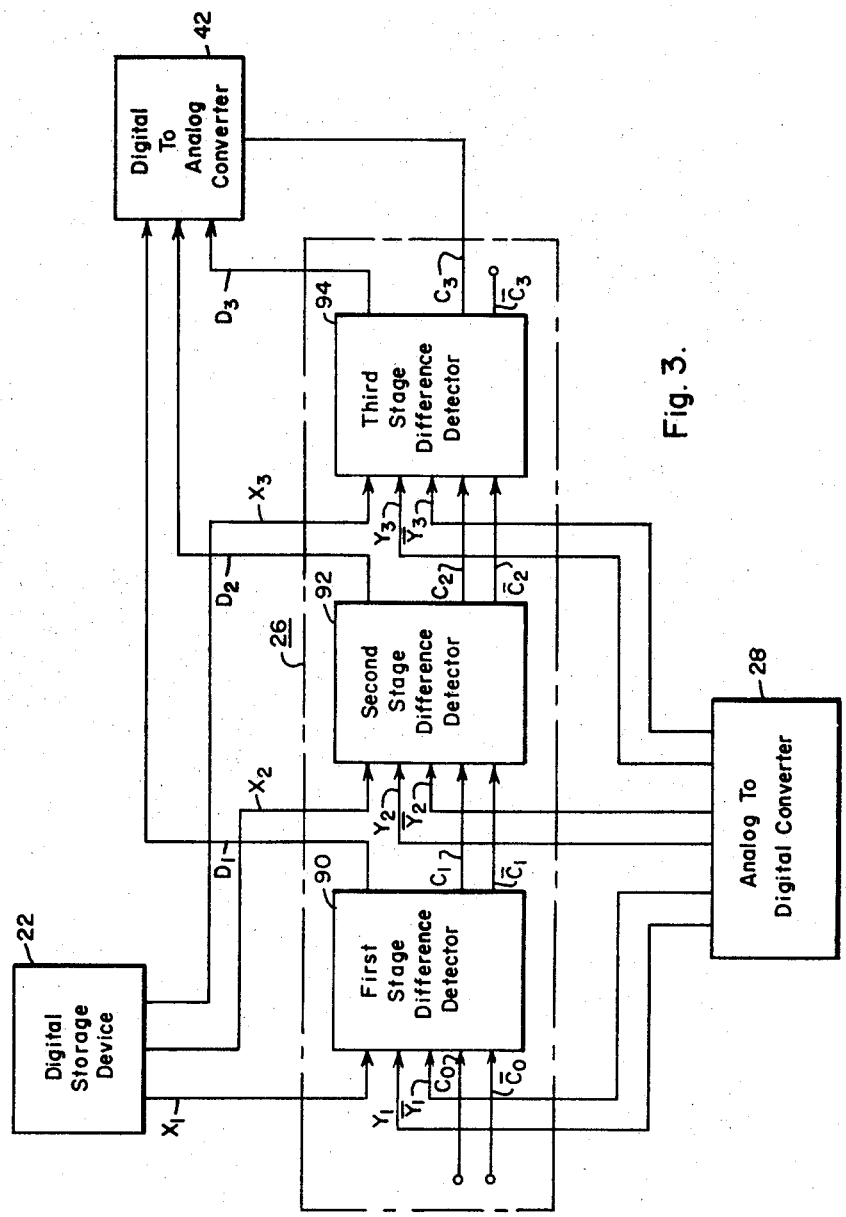
Fig. 3 is a diagrammatic showing of one form of the digital difference device shown in Fig. 1.

In Fig. 3 there is shown a diagrammatic illustration of the digital difference device 26 as shown in Fig. 1. In this regard, the digital information storage device 22 is operative to supply the respective digits $X_1, X_2 \ldots X_n$ of the reference or desired position first binary control signal X and the analog-to-digital converter device 28 is operative to provide the respective digits $Y_1, Y_2 \ldots Y_n$ of the actual position indicating second digital control signal Y. Where $n$ is the required number of digits for the desired position accuracy of the control apparatus, in this regard, the analog-to-digital converter device 28 is also operative to supply the respective complements of the digits of the second binary control signal Y.

It should be here noted that suitable analog-to-digital converter devices are in general well known to persons skilled in this art which are operative to provide the respective plurality of digits and complement digits as required for operation with the digital difference device 26 as shown in Fig. 3. In this regard, a copending application entitled "Control Apparatus for Converter Device," by W. M. Brittain and W. J. Strong, filed November 5, 1957, Serial No. 694,656, and assigned to the same assignee as the present application, described in greater detail suitable analog-to-digital converter apparatus that may be utilized with the control apparatus in accordance with the teachings of the present invention.

The first stage difference detector 90, as shown in Fig. 3, is operative with the first digit $X_1$ of the predetermined desired position indicating or reference first digital control signal X, as received from the digital storage device 22 and the first digit $Y_1$ and its complement $\bar{Y}_1$ of the actual position control signal Y received from the analog-to-digital converter device 28. In addition, an initial carry signal $C_0$ and its complement $\bar{C}_0$ are supplied to the first stage difference detector 90. For the succeeding stages of the difference detector 26, these carry signals are generated by the preceding stages of the digital difference device 26; however, for the first stage difference detector 90, the carry signal $C_0$ is arbitrarily defined as the B— voltage and the complement initial carry signal $\bar{C}_0$ is arbitrarily defined as substantially ground potential.

The first stage difference detector 90 is operative to generate the first digit $D_1$ of the difference $(X_1-Y_1)$ between the digits $X_1$ and $Y_1$ in accordance with the digital subtraction operation as will be later described relative to the apparatus shown in Figs. 4 and 5. The first stage difference detector 90 also is operative to generate the first carry signal $C_1$ and its complement $\bar{C}_1$ which are supplied to the second stage difference detector 92. The second digit $X_2$ of the reference control signal is supplied to the second stage difference detector 92 as are the second digits $Y_2$ and the complement $\bar{Y}_2$ of the actual position control signal. The second stage difference detector 92 is operative to generate the second digit $D_2$ of the difference $(X_2-Y_2)$ between the $X_2$ and $Y_2$ digits and, in addition, to generate the second carry signal $C_2$ and the complement $\bar{C}_2$ which are supplied to a third stage difference detector 94. The third digit $X_3$ of the desired position control signal is supplied to the third stage difference detector 94 as are the third digits $Y_3$ and the complement $\bar{Y}_3$ of the actual position control signal. The third stage difference detector 94 is then operative to generate the third digit $D_3$ of the difference $(X_3-Y_3)$ between the $X_3$ and $Y_3$ digits and to provide a third carry signal $C_3$ and its complement $\bar{C}_3$.

The first, second and third digits $D_1$, $D_2$ and $D_3$ of the difference signal D are supplied to the digital-to-analog converter device 42 as is the third carry signal $C_3$. It should be understood that the difference control signal D may have any desired number of digits, and that three digits and the required control apparatus therefor have been here shown only for the purpose of illustration.

Figure 4:
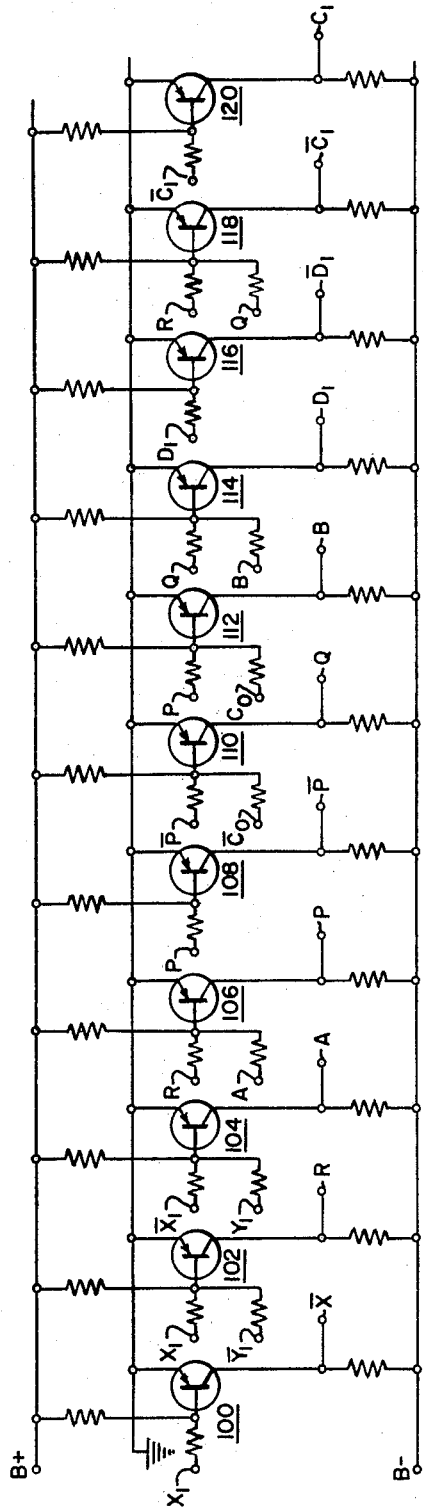
Fig. 4 is a schematic showing of control apparatus in accordance with the present invention.

In Fig. 4 there is shown a digital computer device including eleven stages of NOR devices or NOR circuits with each being connected as shown in Fig. 4 and operative with the indicated input signals to provide the indicated output signals.

Figure 5:
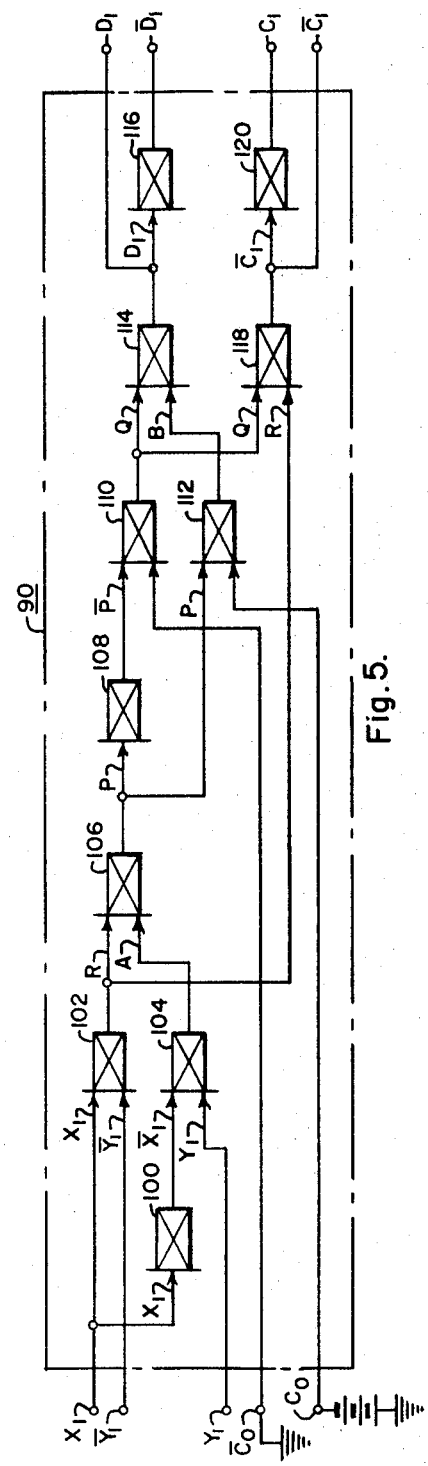
Fig. 5 is a schematic showing of the subject control apparatus operatively connected in accordance with its functional operation.

The schematic showing of Fig. 5 comprises the eleven NOR devices as shown in Fig. 4, however they are arranged in a functional operative arrangement to receive the input signals as a single stage difference detector as shown in Fig. 3 to provide the indicated output signals as shown in Fig. 3.

As well known to persons skilled in this particular art, each of the NOR devices are operative such that it has an output signal when neither of its inputs is energized with an input signal. Thusly, the NOR device 100 is operative to provide the complement $\bar{X}_1$ of a particular digit, here shown as the first digit $X_1$, of the reference control signal X, when the first digit $X_1$ is applied to the input of the NOR device 100. Similarly, the NOR device 102 is operative to provide its output signal R when the $X_1$ digit has a zero value and the $Y_1$ digit has a unit value such that the complement $\bar{Y}_1$ digit has a zero value. The NOR device 104 is operative to provide its output signal A when the complement $\bar{X}_1$ digit has a zero value and the $Y_1$ digit has a zero value. The NOR device 106 is operative to provide its output signal P when the R signal has a zero value and the A signal has a zero value. The NOR device 108 is operative as an inverter device to provide the complement $\bar{P}$ signal of the P signal. The NOR device 110 is operative to provide its output signal Q when the complement $\bar{P}$ digit has a zero value and when the complement initial carry digit $\bar{C}_0$ has a zero value. The NOR device 112 has an output signal B when the P signal has a zero value and the initial carry signal $C_0$ has a zero value. The NOR device 114 is operative to provide its output signal D, when the Q signal has a zero value and the B signal has a zero value. The NOR device 116 is operative as an inverter to provide the complement $\bar{D}$ signal of the D signal. The NOR device 118 is operative to provide its output signal $\bar{C}_1$ which is the complement of the carry signal $C_1$, when the Q signal has a zero value and the R signal has a zero value. The NOR device 120 is operative as an inverter device to provide the carry signal $C_1$ from the complement signal $\bar{C}_1$. Thusly, there is shown in Fig. 5 one of the stage difference detectors, and specifically the first stage difference detector 90, as shown in Fig. 3.

Thusly, there has been shown in accordance with the teachings of the present invention, a digital difference device 26 comprising a plurality of stage difference detectors as shown in Fig. 3, with each of the stage difference detectors being made up of a plurality of similar basic logic elements, namely, the NOR element or circuit. The NOR circuit, it should be here noted, is described in greater detail in a copending patent application entitled "Nor Elements for Control Systems," by W. D. Rowe, filed December 14, 1956, Serial No. 628,332, and assigned to the same assignee as the present application.

The basic function of a digital difference detector device such as shown in Fig. 1, is to perform binary subtractions for each of the respective digits. It must be operative to subtract an actual position control signal Y from a reference signal X to provide an error control signal (X−Y) herein called D. Thusly, if the reference control signal is designated as X and the actual position control signal is designated as Y, the digital difference detector circuit will perform the following operation to provide the position error control signal D, $$D = x_n - Y_n, \ldots X_2 - Y_2, X_1 - Y_1$$

This binary subtraction operation is performed for each digit, and n in the above equation in any predetermined and desired order of digits.

Thusly, as shown in Fig. 3, a difference detector is provided for each stage or digit of the respective control signals, each being operative to perform the subtraction of its respective Y digit from the respective X digit. To perform this binary subtraction, the apparatus is operative to take the one's complement of the X digit which is equal to $\bar{X}$. This $\bar{X}$ digit is added to the Y digit to give $(\bar{X}+Y)$. The binary addition of the quantity $(\bar{X}+Y)$ must take into account the fact that a carry digit C may have to be added to it generated by a previous order subtraction operation relative to a previous digit of the respective control signals X and Y such that for the first stage, the carry digit will be designated $C_0$ and $\bar{C}_0$ as shown in Fig. 3 and for each succeeding stage is designated as the carry digit from the previous stage difference detector. For example, relative to the second stage difference detector 92 as shown in Fig. 3, the carry digit $C_1$ will be added to the quantity $(\bar{X}_2+Y_2)$ to give the desired difference signal $D_2$. Now, if we take the one's complement of the quantity $(\bar{X}_2+Y_2)$ you will get the quantity $(X_2+Y_2)$ which is equal to minus $(Y_2-X_2)$ or $(X_2-Y_2)$, when the quantity $X_2$ is greater than $Y_2$. This is the desired value for the digit $D_2$.

In the operation of the present control apparatus, the final carry digit $C_3$ from the third state detector 94 as shown in Fig. 3, is supplied to the digital-to-analog converted device 42 for controlling the direction of error correction by the converter device 42. In other words, when the $C_3$ carry digit has a unit value, the digital-to-analog converter device 42 is operative to cause the screwdown control motor 30 to operate in an up direction or a space increasing direction at substantially full speed or a predetermined speed until the actual position of the movable roller member 12 provides an actual position control signal Y which when subtracted from the predetermined desired position control signal X results in a zero final carry signal $C_3$. Thereafter, the position of the movable member 12 is moved in a downward direction until the actual position of the roller member 12 corresponds to the predetermined desired position, and the actual position control signal Y is substantially the same as the desired position reference signal X.

One reason for moving the roller member 12 in an upward direction at substantially full speed or a predetermined speed is that the position of the screwdown motor 30 is used to provide the actual position control signal Y. Thusly, any backlash present in the connection between the screwdown motor 30 and the screwdown device 32 is always taken out since the digital or gradually decreasing speed control is always in the same direction, namely, the downward movement direction.

Relative to the showing of Fig. 6, if it is desired to move the roller member 12 from an actual position of 22 inches away from the fixed roller member 14 to a predetermined desired position of 36 inches away from the roller member 14, then the final carry signal would have a unit value, since an increase in the spacing was desired, to cause the screwdown motor 30 to move the roller member 12 at substantially full speed away from the roller member 14. The final carry signal, for example $C_3$, would have a zero value when the roller member reached the 36 inches of spacing position and the screwdown motor 30 would begin to slow down. It may take about 12 additional inches of travel to come to a full stop; this distance can be predetermined and so controlled. Then the screwdown motor 30 would move the roller member 12 from the 48 inches of spacing position toward the desired 36 inches of spacing position in a gradually decreasing speed and digitally controlled manner as explained in greater detail in said copending patent application Serial No. 653,122 filed April 16, 1957 by M. W. Brittain and entitled "Automatic Digital Control Apparatus."

It should be noted relative to the diagrammatic showing of Fig. 5 for a particular digit, such as the second digit, that the NOR device 100 is operative as an inverter device to provide the complement of the $X_2$ digit signal, namely, the $\bar{X}_2$ signal. The NOR devices 102, 104, 106 and 108 are operative as a first half adder circuit corresponding to the half adder circuit 74 as shown in Fig. 2. The NOR devices 110, 112, 114 and 116 are operative as a second half adder circuit corresponding to the half adder device 72 as shown in Fig. 2. The NOR devices 118 and 120 are operative as the OR circuit 76 as shown in Fig. 2. Similar control apparatus would be provided for each digit of the reference control signal X and the actual position control signal Y.

Figure 7:
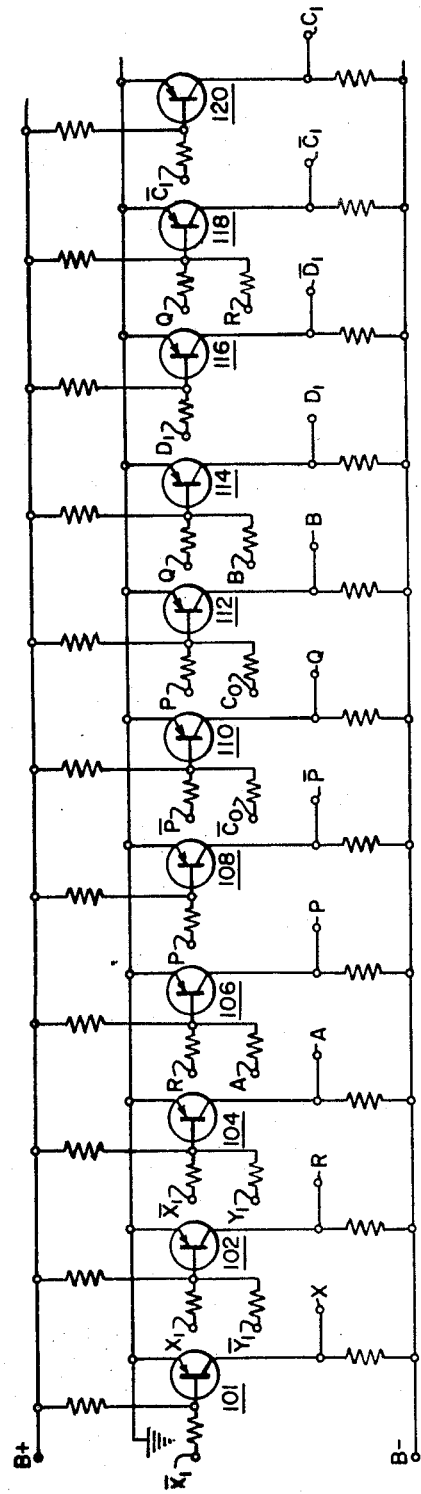
Fig. 7 shows a modification of the control apparatus shown in Fig. 4.
Figure 8:
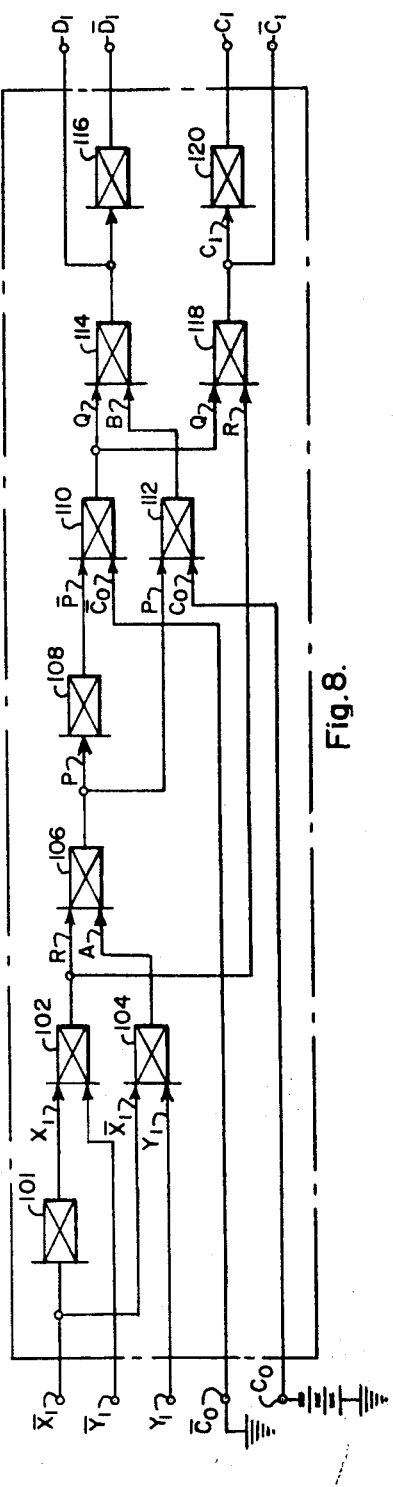
Fig. 8 shows a modification of the control apparatus shown in Fig. 5.

The control apparatus as shown in Figs. 7 and 8 is operative with complement reference or desired position signals $\bar{X}$ supplied from the information storage device 22, when such operation should be desirable.

Although the present invention has been described with a certain degree of particularity, it should be understood that the present disclosure has been made only by way of example and that numerous changes in the details of construction and the combination and arrangement of parts may be resorted to without departing from the scope and the spirit of the present invention.

I claim as my invention:

1. In position control apparatus for controlling the actual position of a movable member relative to a predetermined desired position for said member, said control apparatus being operative with a first control element for providing a first control signal X as a function of said predetermined desired position, and said control apparatus being operative with a second control element for providing a second control signal Y and the complement $\bar{Y}$ of said second control signal as a function of said actual position, the combination of a first NOR control device responsive to said first control signal X for providing the complement $\bar{X}$ of said first control signal, a second NOR control device responsive to at least said first control signal X and second control signal Y for providing a third control signal C and the complement $\bar{C}$ of said third signal as a predetermined function of at least said first signal X and second signal Y, and a third NOR control device operative with said second NOR control device and responsive to at least said first and second control signals X and Y and the respective complements $\bar{X}$ and $\bar{Y}$ of said first and second control signals for providing a fourth control signal D in accordance with a predetermined relationship between said first and second control signals X and Y and said respective complement signals $\bar{X}$ and $\bar{Y}$, with said movable member being responsive to said fourth control signal D for controlling the position of said movable member.

2. In position control apparatus for controlling the actual position of a movable member relative to a predetermined desired position for said member, said control apparatus being operative with a first control element for providing a first digital control signal $X_1, X_2 \ldots X_n$ as a function of said predetermined desired position, and said control apparatus being operative with a second control element for providing a second digital control signal $Y_1, Y_2 \ldots Y_n$ and the digital complement $\bar{Y}_1, \bar{Y}_2 \ldots \bar{Y}_n$ of said second control signal as a function of said actual position, the combination of first NOR control means responsive to at least one digit of said first digital control signal for providing at least one corresponding digit of the digital complement $\bar{X}_1, \bar{X}_2 \ldots \bar{X}_n$ of said first control signal, second NOR control means responsive to at least another digit of each of said first and second control signals for providing a third control signal C and the complement $\bar{C}$ of said third control signal as a predetermined function of at least the latter said another digit of each of said first and second signals, and third NOR control means operative with said second NOR control means and responsive to at least said one digit of said first and second control signals and responsive to at least said one digit of the respective complements of said first and second control signals for providing a fourth control signal D, with said movable member being responsive to said fourth control signal D for controlling the position of said movable member.

3. In position control apparatus for controlling the actual position of a movable member relative to a predetermined desired position for said member, said control apparatus being operative with a first control element for providing a first digital control signal having at least two digits $X_1$ and $X_2$ as a function of said predetermined desired position, and said control apparatus being operative with a second control element for providing a second digital control signal having at least two digits $Y_1$ and $Y_2$ and the digital complement having at least two digits $\bar{Y}_1$ and $\bar{Y}_2$ of said second control signal as a function of said actual position, the combination of a first NOR control device responsive to said first control signal second digit $X_2$ for providing the second complement $\bar{X}_2$ of said first control signal, a second NOR control device responsive to at least the first digits $X_1$ and $Y_1$ of respectively said first and second control signals for providing a third control signal $C_1$ and its complement $\bar{C}_1$ as a predetermined function of the latter said first digits $X_1$ and $Y_1$, and a third NOR control device responsive to at least the second digits $X_2$ and $Y_2$ of said first and second control signals and the respective complement digits $\bar{X}_2$ and $\bar{Y}_2$ of said first and second control signals for providing a fourth control signal D, with said movable member being responsive to said fourth control signal D for controlling the position of said movable member.

4. In position control apparatus for controlling the actual position of a movable member to correspond substantially to a predetermined desired position for said member, said control apparatus being operative with a first control element for providing a first digital control signal $X_1, X_2, \ldots X_n$ as a function of said predetermined desired position, and said control apparatus being operative with a second control element for providing a second digital control signal $Y_1, Y_2, \ldots Y_n$ and the digital complement $\bar{Y}_1, \bar{Y}_2, \ldots \bar{Y}_n$ of said second control signal as a function of said actual position, the combination of a first NOR control device responsive to a predetermined digit $X_x$ of said first control signal for providing the digital complement $\bar{X}_x$ of said predetermined digit $X_x$, a second NOR control device including at least one NOR element and being responsive to the next lower digit $X_{x-1}$ relative to said predetermined digit $X_x$ of the first control signal and responsive to the next lower digit $Y_{x-1}$ relative to a corresponding predetermined digit $Y_x$ of the second control signal for providing a third control signal $C_{x-1}$, and a third NOR control device including at least one NOR element and being operative with said second control device and responsive to at least said predetermined digits $X_x$ and $Y_x$ and their complement digits $\bar{X}_x$ and $\bar{Y}_x$ for providing a fourth control signal $D_x$ in accordance with a predetermined Boolean algebra expression, with said movable member being responsive to said fourth control signal $D_x$ for controlling the position of said movable member.

5. In position control apparatus for controlling the actual position of a movable member relative to a predetermined desired position for said member, said control apparatus being operative with a first control element for providing a first digital control signal $X_1, X_2, \ldots X_n$ as a function of said predetermined desired position, and said control apparatus being operative with a second control element for providing a second digital control signal $Y_1, Y_2, \ldots Y_n$ and the digital complement $\bar{Y}_1, \bar{Y}_2, \ldots \bar{Y}_n$ of said second control signal as a function of said actual position, the combination of a first NOR control device responsive to a predetermined digit $X_x$ of said first control signal for providing the complement digit $\bar{X}_x$ of said predetermined digit $X_x$, a second NOR control device including at least one NOR element and being responsive to the next lower digit $X_{x-1}$ of said predetermined digit $X_x$ of the first control signal and responsive to the next lower digit $Y_{x-1}$ of a corresponding predetermined digit $Y_x$ of the second control signal for providing a third control signal $C_{x-1}$, and a third NOR control device including at least one NOR element operative with said second control device and responsive to at least said predetermined digits $X_x$ and $Y_x$ and their complement digits $\bar{X}_x$ and $\bar{Y}_x$ for providing a fourth control signal $D_x$ in accordance with a predetermined relationship between said digits $X_x$ and $Y_x$ and their complement digits $\bar{X}_x$ and $\bar{Y}_x$, with said movable member being responsive to said fourth control signal $D_x$ for controlling the position of said movable member.

6. In position control apparatus for controlling the actual position of a movable member relative to a predetermined desired position for said member, said control apparatus being operative with a first control element for providing a first digital control signal $X_1, X_2, \ldots X_n$ as a function of said predetermined desired position, and said control apparatus being operative with a second control element for providing a second digital control signal $Y_1, Y_2, \ldots Y_n$ and the digital complement $\bar{Y}_1, \bar{Y}_2, \ldots \bar{Y}_n$ of said second control signal as a function of said actual position, the combination of a first NOR control device responsive to a predetermined digit $X_x$ of said first control signal for providing the complement digit $\bar{X}_x$ of said predetermined digit $X_x$, a second NOR control device including at least one NOR element having a plurality of inputs and an output and having one of said inputs responsive to the next lower digit $X_{x-1}$ relative to said predetermined digit $X_x$ of the first control signal and having another of said inputs responsive to the next lower digit $Y_{x-1}$ relative to a corresponding predetermined digit $Y_x$ of the second control signal for providing at said output a third control signal $C_{x-1}$, and a third NOR control device including at least one NOR element and being operative with said second control device and responsive to at least said predetermined digits $X_x$ and $Y_x$ and their complement digits $\bar{X}_x$ and $\bar{Y}_x$ for providing a fourth control signal $D_x$ in accordance with the predetermined Boolean algebra expression $$D_x = \bar{C}_{x-1}(X_x Y_x + \bar{X}_x \bar{Y}_x) + C_{x-1}(\bar{X}_x Y_x + X_x \bar{Y}_x)$$

with said movable member being responsive to said fourth control signal $D_x$ for controlling the position of said movable member.

References Cited in the file of this patent
UNITED STATES PATENTS

| | | |
|---|---|---|
| 2,685,054 | Brenner et al. | July 27, 1954 |
| 2,729,773 | Steele | Jan. 3, 1956 |
| 2,775,727 | Kernahan et al. | Dec. 25, 1956 |
| 2,785,856 | Hobbs | Mar. 19, 1957 |
| 2,821,696 | Shiowitz et al. | Jan. 28, 1958 |
| 2,829,323 | Steele | Apr. 1, 1958 |
| 2,837,732 | Nelson | June 3, 1958 |